(12) United States Patent
Johansson

(10) Patent No.: US 6,975,613 B1
(45) Date of Patent: Dec. 13, 2005

(54) SYSTEM AND METHOD FOR SCHEDULING COMMUNICATION SESSIONS IN AN AD-HOC NETWORK

(75) Inventor: Per Johansson, Hägersten (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/454,758

(22) Filed: Dec. 6, 1999

(51) Int. Cl.[7] .......................... H04Q 7/24; H04Q 7/00; H04L 12/28; H04J 3/16
(52) U.S. Cl. .................. 370/338; 370/331; 370/468; 370/351
(58) Field of Search ................... 370/280, 294, 370/468, 341, 346, 331, 332, 329, 330, 328, 370/431, 395.21, 395.41, 395.42, 400, 337, 370/348, 254; 209/208; 709/209; 455/421, 455/422, 69, 33.1, 436, 41.2

(56) References Cited

U.S. PATENT DOCUMENTS

| | | | |
|---|---|---|---|
| 5,051,984 A | 9/1991 | Mostafa et al. | |
| 5,056,085 A | 10/1991 | Vu | |
| 5,065,399 A | 11/1991 | Hasegawa et al. | |
| 5,173,689 A | 12/1992 | Kusano | |
| 5,235,599 A | 8/1993 | Nishimura et al. | |
| 5,592,469 A * | 1/1997 | Szabo | 370/342 |
| 5,719,861 A | 2/1998 | Okanoue | |
| 5,740,366 A | 4/1998 | Mahany et al. | |
| 5,748,611 A | 5/1998 | Allen et al. | |
| 5,844,900 A * | 12/1998 | Hong et al. | 370/342 |
| 5,848,266 A * | 12/1998 | Scheurich | 370/468 |
| 5,987,011 A * | 11/1999 | Toh | 370/331 |
| 6,122,291 A * | 9/2000 | Robinson et al. | 370/468 |
| 6,304,556 B1 * | 10/2001 | Haas | 370/254 |
| 6,377,805 B1 * | 4/2002 | Anvekar et al. | 455/436 |
| 6,418,148 B1 * | 7/2002 | Kumar et al. | 370/468 |
| 6,577,613 B1 * | 6/2003 | Ramanathan | 370/337 |
| 6,650,655 B2 * | 11/2003 | Alvesalo et al. | 370/468 |
| 6,650,871 B1 * | 11/2003 | Cannon et al. | 455/41.2 |
| 6,678,252 B1 * | 1/2004 | Cansever | 370/253 |
| 6,691,173 B2 * | 2/2004 | Morris et al. | 709/249 |

FOREIGN PATENT DOCUMENTS

| | | |
|---|---|---|
| EP | 0294233 A2 | 12/1988 |
| EP | 0599764 A1 | 6/1994 |
| EP | 0715478 A2 | 6/1996 |
| EP | 0883265 A2 | 12/1998 |
| EP | 0913965 A1 | 5/1999 |
| GB | 2 229 895 A | 10/1990 |
| WO | 9911025 A1 | 3/1999 |
| WO | 9923799 A1 | 5/1999 |

OTHER PUBLICATIONS

Takagi, Hideaki, "Queuing Analysis of Polling Models", ACM Computing Surveys, vol. 20, No. 1, Mar. 1988.

Johansson, Per, et al., "Short Range Radio Based Ad-hoc Networking: Performance and Properties", Proceedings of International Conference on Communications (ICC'99), Jun. 6-10, 1999.

(Continued)

Primary Examiner—Hanh Nguyen
(74) Attorney, Agent, or Firm—Potomac Patent Group PLLC

(57) ABSTRACT

Systems and methods for scheduling inter-piconet communication in ad-hoc communication networks are disclosed. A first network node transmits a capacity allocation message to a second network node, which message includes a parameter indicative of the capacity requested from the second terminal and a representation of available capacity in the first terminal. The second terminal performs a matching function to determine whether there is mutually acceptable available capacity that is allocable to a communication session with the first terminal.

12 Claims, 10 Drawing Sheets

OTHER PUBLICATIONS

"Specification of the Bluetooth System", Bluetooth SIG, vol. 0, Jul. 24, 1999; pp. 35-40 and pp. 121-122.

Albrecht, M., et al., "IP Services over Bluetooth: Leading the Way to a New Mobility", Proceedings of the Conference on Local Computer Networks, Oct. 1999.

Tode, H., et al., "A Routing Method Using a Tunable Cost Function to Obtain Required Communication Quality and Performance", Electronics and Communications in Japan, Part 1. vol. 81, No. 5, 1998.

Haartsen, J., "Bluetooth—The Universal Radio Interface for Ad Hoc, Wireless Connectivity", Ericsson Review No. 3 (1998), pp. 110-117.

Haartsen, J., "Bluetooth—The Universal Radio Interface for Ad Hoc, Wireless Connectivity" Ericsson Review No. 3 (1998), pp. 110-117, XP000783249.

U.S. Appl. No. 09/455,168 filed Dec. 6, 1999.

U.S. Appl. No. 09/455,460 filed Dec. 6, 1999.

U.S. Appl. No. 09/455,172, filed Dec. 26, 2000 (Provisional filed, Dec. 6, 1999).

U.S. Appl. No. 09/696,242, filed Dec. 6, 1999.

Toh, Chai-Keong, "Associativity-Based Routing for Ad-Hoc Mobile Networks", *Wireless Personal Communications*, vol. 4:103-139, 1997.

\* cited by examiner

- ⊘ BLUETOOTH UNIT (MASTER)
- ○ BLUETOOTH UNIT (SLAVE)

SCATTERNET EXAMPLE OF TWO SIMULTANEOUS PICONETS

Mx = MASTER OF PICONET x
Sxy = SLAVE IN PICONET x WITH id (AM_ADDR) y

SCATTERNET EXAMPLE OF THREE SIMULTANEOUS PICONETS

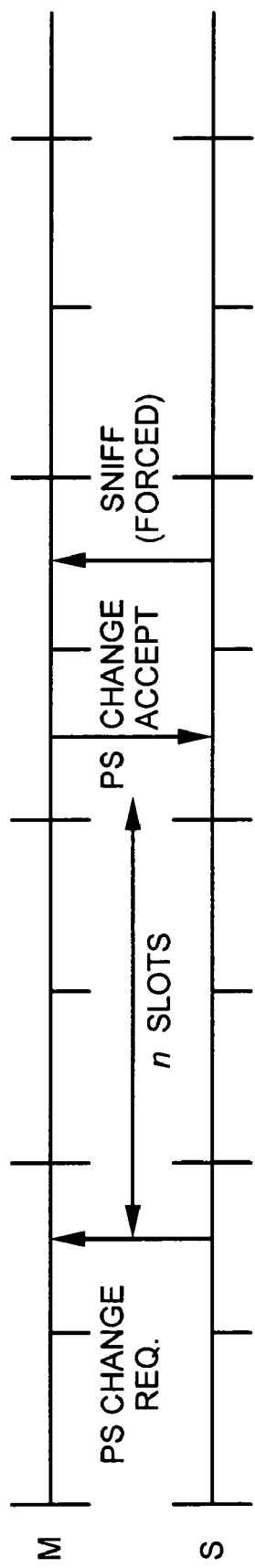
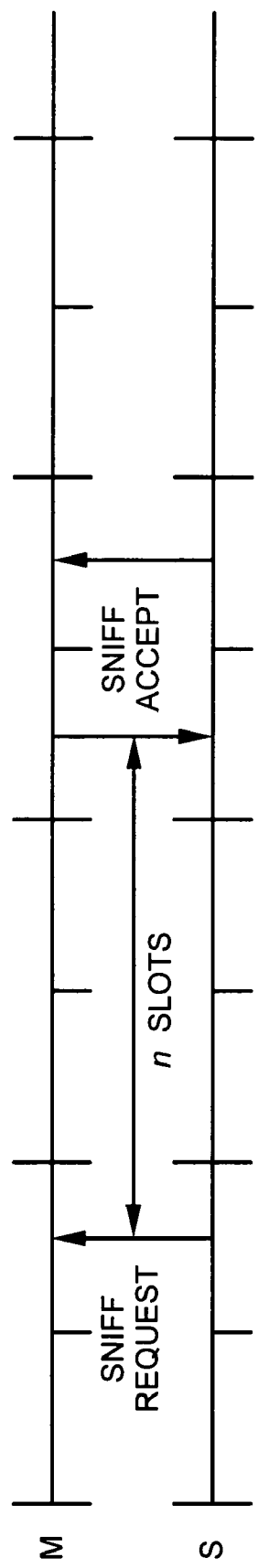
FIG. 9A
FIG. 9B

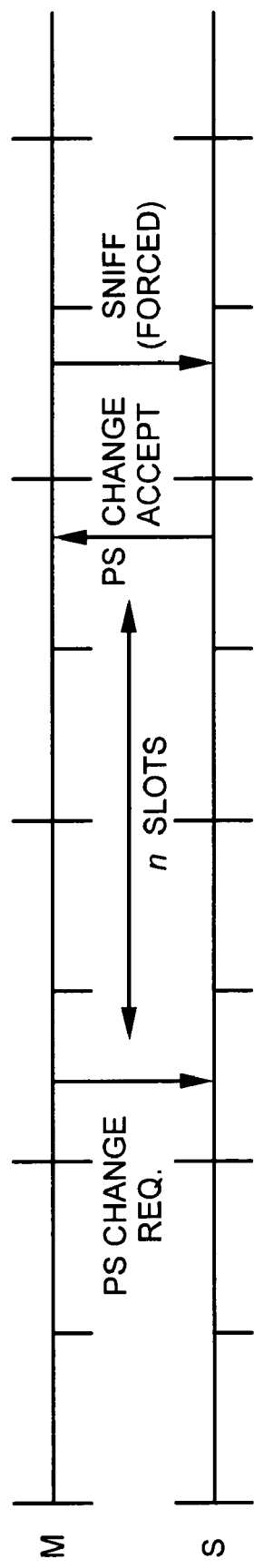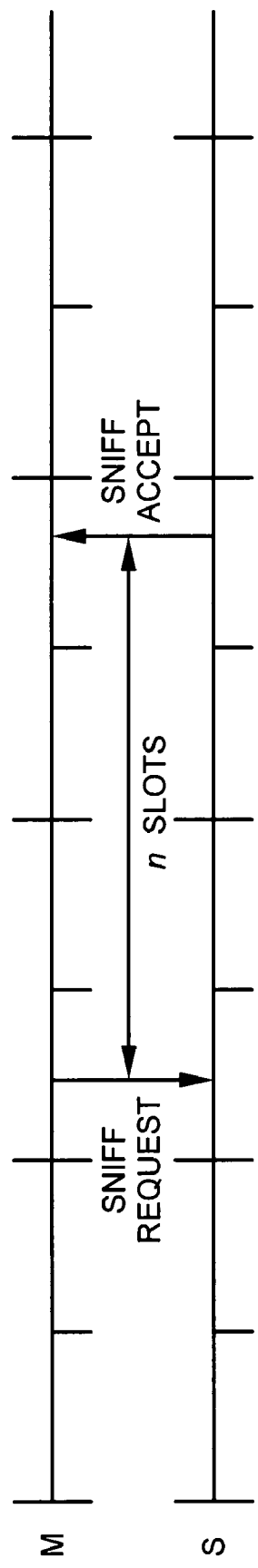

SYSTEM AND METHOD FOR SCHEDULING COMMUNICATION SESSIONS IN AN AD-HOC NETWORK

CROSS-REFERENCE TO RELATED APPLICATIONS

This application is related to the following co-pending applications: U.S. patent application Ser. No. 09/455,168 for "Route Updating In Ad-Hoc Networks"; U.S. Provisional Application No. 60/168,742 for "Route Discovery Based Piconet Forming"; U.S. patent application Ser. No. 09/455,460 for "Broadcast as a Triggering Mechanism for Route Discovery"; and U.S. patent application Ser. No. 09/455,172 for "Batched Fair Exhaustive Polling Scheduler", all of which are herein expressly incorporated by reference.

BACKGROUND

The present invention relates to electronic communication in ad-hoc communication networks, and more particularly relates to systems and methods for scheduling inter-piconetwork communication sessions that accommodate Quality of Service (QoS) parameters.

Traditional communication networks are commonly designed according to a hierarchical architecture. User communication accesses the network via a source node and is routed through dedicated equipment in the network to a destination node. For example, in a wireless, cellular communication network a user originates a communication session by dialing the telephone number of a desired destination. The user's call is received in a base transceiver station (BTS), where it is typically transferred across a wireline network to the destination. Of course, if the destination is also a wireless remote terminal (e.g., a cellular phone) then the call is routed to a BTS in the cell in which the phone resides at the time. The BTS transmits the user communication across the wireless interface to the cellular phone. It will be appreciated that the remote terminals may include data terminals such as, for example, Personal Computers (PC's), Personal Digital Assistants (PDAs), or other terminals capable of transmitting data packets.

Hierarchical communication networks represent an inefficient use of the radio spectrum in circumstances which the remote terminals are sufficiently close together that they could communicate directly. Establishing a connection through the network requires that two links (e.g., radio channels) be established and consumes resources of three radio units (e.g., two remote terminals and a BTS) in the session when only a single link or channel would be required if the terminals could communicate directly. Thus, forcing the communication session through the network reduces the network capacity by a factor of two. To make better use of network resources, and thereby improve network efficiency, remote terminals should communicate with other terminals directly, if possible.

Ad-hoc communication networks attempt to address this situation by providing remote terminals with the capability to form direct (e.g., ad-hoc) connections, without the assistance of an intervening communication network. Wireless systems that support ad hoc connections should provide direct communication among any radio units that are in range of one another.

The technology specifications referred to as Bluetooth provide an exemplary ad-hoc communication network. Bluetooth is an ad-hoc wireless network technology intended for both synchronous traffic, e.g., voice, and asynchronous traffic, e.g. IP based data traffic. The goal of Bluetooth is to enable any commodity device such as telephones, PDAs, laptop computers, digital cameras, video monitors, printers, fax machines, etc. to engage in ad-hoc communication sessions over a radio interface, assuming, of course, that the devices contain a Bluetooth radio chip and associated software.

Such ad-hoc communication sessions can use the unlicensed ISM bands at 900 MHz and 2400 MHz which have been opened for commercial applications, and many products have been introduced providing wireless communications in these bands. The use of these radio bands is restricted in the United States by Part 15 of the rules of the Federal Communications Commission (FCC) and in Europe by ETS 300 328 of the European Telecommunication Standards Institute (ETSI). Other countries apply similar rules. Briefly stated, the rules require a user to spread its transmitted power over the frequency band in order to minimize the chance of interference with other users.

Such spreading can be achieved by either of two techniques known in the art of spread spectrum communication systems. In the frequency hopping technique, the transmitter emits a carrier signal that is modulated in a conventional way by the information to be sent and the frequency of the carrier signal is changed (hopped) according to a predetermined pattern that is known to the receiver. GSM-type systems are well-known examples of frequency hopping systems. In the general direct-sequence technique, binary information to be sent is combined with a noise-like, higher-bit-rate binary sequence that is known to the receiver and the combination sequence modulates a carrier signal having a fixed frequency.

The Bluetooth specifications support both point-to-point and point-to-multipoint network connections. Within the Bluetooth specifications, the term piconet refers to two or more devices engaged in an ad-hoc radio connection. Under current standards, a piconet may include a minimum of two and a maximum of eight connected devices. One device in the piconet assumes the role of a master device, commonly referred to as the "master", and will direct the communication session with the other devices in the piconet, which are referred to as "slave" devices. The master unit's clock cycle and hopping sequence are used to synchronize all other slave devices in the piconet. Schematic depictions of Bluetooth piconets are shown in FIG. 1. Piconet 110 is a point-to-point piconet, with the master node 112 illustrated as a darkened node, and a single slave node 114, illustrated as a whitened node. Piconet 120 is a point-to-multipoint piconet having a master node 122 and two slave nodes 124, 126. Piconet 130 includes master node 132 and seven slave nodes 134–146.

Furthermore, two or more piconets can be interconnected, forming what is referred to in Bluetooth as a scatternet. Each piconet includes a master unit and, accordingly, may have its own timing and frequency hopping scheme; connected piconets may be independent and unsynchronized. The network node that defines the connection point between two piconets includes a Bluetooth unit that is a member of both piconets. A Bluetooth unit can be a slave member of multiple piconets, but can be a master in only one piconet. Also, a Bluetooth unit that acts as master in one piconet can participate in other piconets as a slave. FIG. 2 is a schematic depiction of a Bluetooth scatternet comprising twelve interconnected piconets. Bluetooth units that act only as master units in their respective piconet are depicted as darkened circles (e.g., M1, M3, M4, M6, M7, M 7, M 9, M 11, M12). Bluetooth units that act as master units in one piconet and slave units in a separate piconet are illustrated as halfdarkened circles (e.g., M2, M5, M8). Bluetooth units that act as master units in one piconet and slave units in two separate piconets are illustrated with one-third of the circle darkened (e.g., M10). Slave units are similarly divided to illustrate the number of piconets to which the unit belongs.

A Bluetooth unit can transmit and receive data in one piconet at an given point in time, so participation in multiple piconets has to be divided on a time division multiplex basis. The Bluetooth system provides full-duplex transmission built on slotted Time Division Duplex (TDD) in which each slot is 0.625 ms long. The time slots are numbered sequentially using a very large number range (e.g. cyclic with a cycle of $2^{27}$). Master-to-slave transmission starts in an even-numbered time slot while slave-to-master transmission starts in an odd-numbered time slot. An even-numbered time slot and its subsequent odd-numbered time slot (i.e., a master-to-slave time slot and a slave-to-master time slot, except when multi-slot packets are used) together are called a frame. There is no direct transmission between slaves in a Bluetooth piconet; all communication takes place between master and slave nodes.

Communication within a piconet is organized such that the master polls each slave according to a polling scheme. A slave is only allowed to transmit after having been polled by the master. The slave then starts its transmission in the slave-to-master time slot immediately following the packet received from the master. The master may or may not include data in the packet used to poll a slave.

Each Bluetooth unit has a globally unique 48 bit IEEE 802 address. This address, called the Bluetooth Device Address (BD_ADDR) is assigned when the BT unit is manufactured and it is never changed. In addition, the master of a piconet assigns a local Active Member Address (AM_ADDR) to each active member of the piconet. The AM_ADDR, which is three bits long, is dynamically assigned and is unique only within a single piconet. The master uses the AM_ADDR when polling a slave in a piconet. However, when the slave, triggered by a packet from the master addressed with the slave's AM_ADDR, transmits a packet to the master, it includes its own AM_ADDR (not the master's) in the packet header.

Even though all data is transmitted in packets, the packets can carry both synchronous data on Synchronous Connection Oriented (SCO) links (mainly intended for voice traffic), and asynchronous data on Asynchronous Connectionless (ACL) links. Depending on the type of packet that is used, an acknowledgment and retransmission scheme may be used (not for SCO packets transferring synchronous data) to ensure reliable transfer of data (as well as forward error correction (FEC) in the form of channel coding).

The standard format of a Bluetooth packet (although there are exceptions for certain controls packets) is shown in FIG. 3. The AM_ADDR is located in the packet header followed by some control parameters (e.g., a bit indicating acknowledgment or retransmission request of the previous packet, when applicable) and a header error check (HEC).

The format of the payload depends on the type of packet. The payload of an ACL packet consists of a header, a data field and (with the exception of AUX1 type packets) a cyclic redundancy check (CRC). The payload of an SCO packet consists of only a data field. In addition there are hybrid packets including two data fields, one for synchronous data and one for asynchronous data. Packets in which the payload does not include a CRC are neither acknowledged nor retransmitted.

Thus, Bluetooth specifications describe how to create piconets and form scatternets, and how to manage intra-piconet communication between Bluetooth units. However, systems and methods for managing inter-piconet communication, especially with a controlled QoS for the participating nodes, have not yet been considered. In particular, methods for communicating between piconets in a scatternet with controlled delay and throughput have not yet been addressed in the Bluetooth specifications. Accordingly, there is a need in the art to provide communication sessions in an ad-hoc communication network that can provide desired QoS parameters. Further, there is a need to provide communication sessions that can provide a desired delay and throughput.

SUMMARY

The present invention addresses these and other needs by providing systems and methods for managing inter-piconet communication in ad-hoc communication network. Advantageously, systems and methods of the present invention enable efficient time sharing for nodes taking part in two or more piconets in a packet radio system, where the node can be active in only one piconet in a time window. Further, the invention enables either a periodic active window pattern or a renegotiated window on a per visit basis. The period of an periodic active window pattern may be scaled up or down to allow for delay sensitive traffic to take part.

The invention also provides for separation of different priority classes when the active windows are allocated between nodes in the clustered network. The invention enables an adaptive allocation of active windows to enable an efficient utilization of the network resources. The adaptive allocation mechanism also allow a network wide fairness for allocated multihop traffic flows.

In one aspect, the invention provides, in an ad-hoc communication network in which terminals may belong to more than one piconet, a method of modifying the allocation of a terminal's capacity between two or more networks, comprising the steps of:

receiving, in a first terminal, a request from a second terminal to modify the first terminal's capacity allocation;

determining whether the first terminal has sufficient available capacity to accommodate the request; and if the available capacity is sufficient, then comparing the capacity allocation of the first terminal to the capacity allocation of the second terminal to determine mutually acceptable capacity blocks allocable to satisfy the request.

In another aspect, the invention provides, in an ad-hoc communication network comprising a plurality of Bluetooth units adapted to allocate capacity between at least two different piconets, a method of modifying a terminal's capacity allocation between a first piconet and a second piconet, comprising the steps of:

receiving, in a first terminal, a request from a second terminal to modify the first terminal's capacity allocation, the request including a digital representation of the second terminal's capacity allocation;

determining whether the first terminal has sufficient available capacity to accommodate the request; and if the first terminal's available capacity is sufficient, then comparing the capacity allocation of the first terminal to the capacity allocation of the second terminal to determine mutually acceptable capacity blocks allocable to satisfy the request.

In yet another aspect, the invention provides a capacity allocation module for a first communication terminal, comprising
- a communication module for receiving a request from a second communication terminal to modify the first terminal's capacity allocation, the request including a digital representation of the second terminal's capacity allocation;
- a memory module for storing a digital representation of the first terminal's capacity allocation;
- a processor module operative associated with the memory module for comparing the first terminal's capacity allocation with the second terminal's capacity allocation to determine mutually acceptable capacity blocks allocable to satisfy the request.

BRIEF DESCRIPTION OF THE DRAWINGS

These and other objects, features and advantages of the present invention will become more readily apparent to those skilled in the art upon reading the following detailed description, in conjunction with the appended drawings, in which:

FIG. 9a is a schematic depiction of a piconet scheduler list change procedure initiated by a slave terminal's Piconet scheduler change LMP message in accordance with aspects of the present invention;

FIG. 9b is a schematic depiction of a piconet scheduler list change procedure initiated by a slave terminal's SNIFF Request in accordance with aspects of the present invention;

FIG. 10a is a schematic depiction of a piconet scheduler list change procedure initiated by a master terminal's Piconet scheduler change LMP message in accordance with aspects of the present invention;

FIG. 10b is a schematic depiction of a piconet scheduler list change procedure initiated by a master terminal's SNIFF Request in accordance with aspects of the present invention;

DETAILED DESCRIPTION

Figure 1:
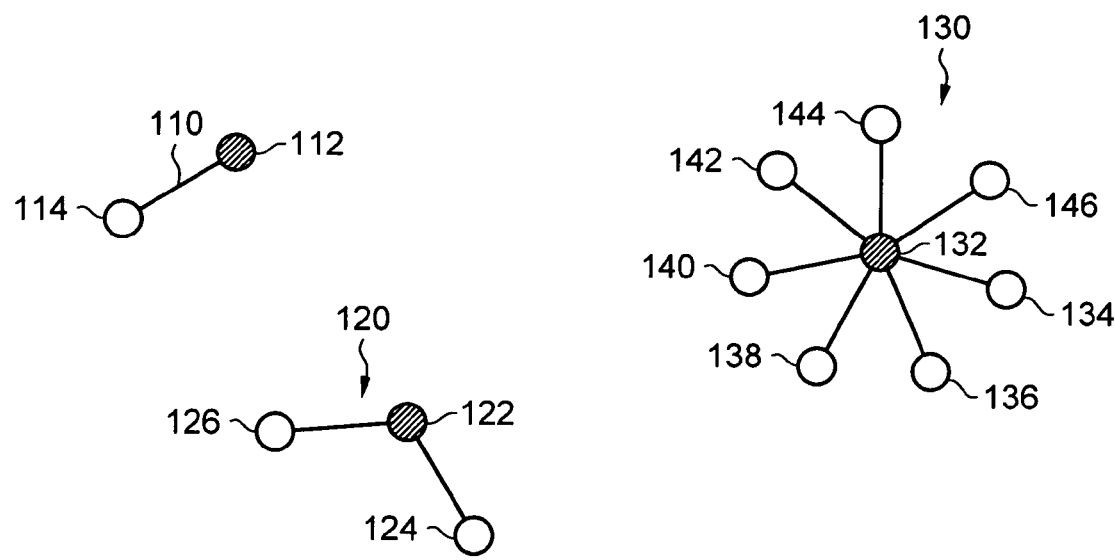
FIG. 1 is a schematic depiction of piconets of an ad-hoc communication network.
Figure 3:
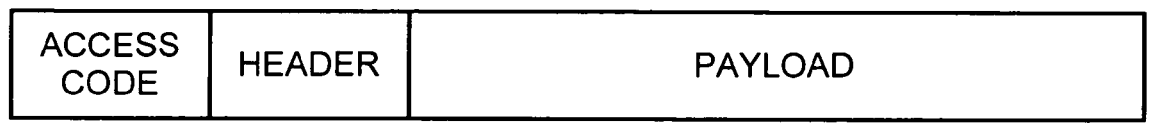
FIG. 3 is a schematic depiction of a packet used in an ad-hoc communication network.
Figure 2:
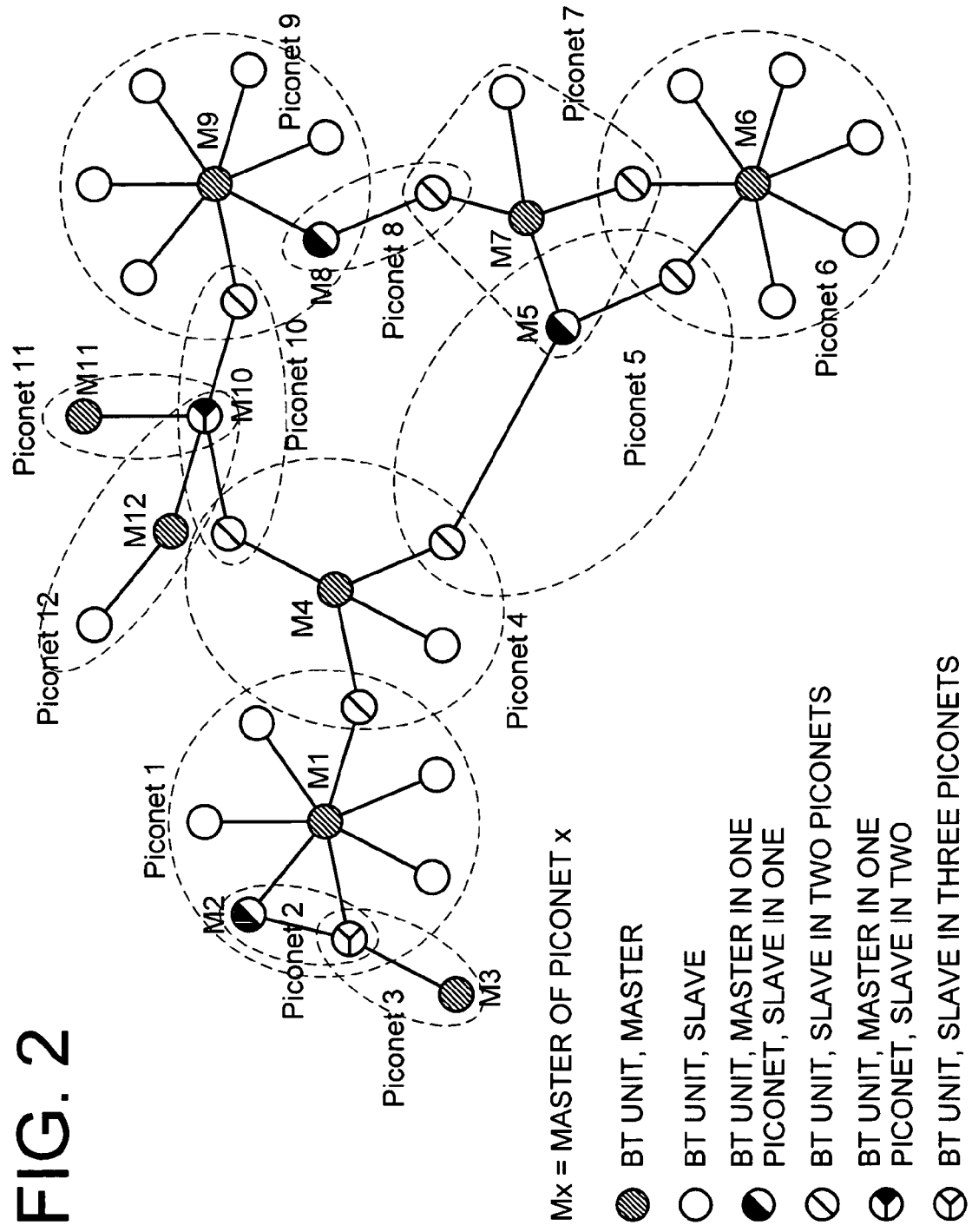
FIG. 2 is a schematic depiction of a plurality of piconets interconnected to form a scatternet.

The present invention will be described in the context of Bluetooth networks and using terminology applicable to Bluetooth networks. However, it will be appreciated that the invention is equally applicable to other ad-hoc network technologies, and will be described generalized to be applicable also to other network technologies.

Bluetooth is based on a master-slave architecture in which intra-piconet communication traffic flows between a master and a slave using Time Division Duplex (TDD) frames. A slave in a piconet can be addressed (e.g., polled) at any start of a frame unless a power saving mode (e.g., any of the PARK, SNIFF, or HOLD modes) is invoked in the slave. The slaves in a piconet are synchronized with the frame and frequency hoping sequence of the master. For a single piconet the task of providing a controlled bit rate and delay of the traffic to the slaves is managed by the master alone and should be handled with a scheduler located in the master unit. A modified exhaustive polling algorithm, denoted Batched Fair Exhaustive Polling (B-FEP), is presented in co-pending and commonly assigned U.S. patent application entitled Batched Fair Exhaustive Polling Scheduler, incorporate by reference above. B-FEP is believed to give high BW efficiency with a fair allocation, while still being simplistic.

The present invention is particularly concerned with providing inter-piconet communication, i.e., communication between nodes belonging to different piconets. It is assumed herein that a Bluetooth unit hosts several slave entities and, at most, one master entity to handle the abstraction of presence in several piconets. Scheduling the presence of a Bluetooth unit in different piconets in order to enable a controlled inter-piconet traffic flow. Since a single transceiver unit is assumed, a unit can only activate one entity (master or slave) at a time, i.e. the other entities cannot send or receive any information during that time. In short, in one aspect, the present invention addresses the problem of scheduling time periods where both nodes of a link have their transceiver tuned in to the same piconet, while minimizing losses due to timing mis-match. A timing mis-match occurs when two units in separate piconets each have idle capacity available, but are unable to use the idle capacity because there is no simultaneously available time window. While two units are scheduled for inter-piconet traffic (always one master and one slave) the slave unit becomes part of the master's piconet and should also be scheduled by the intra-piconet scheduler. Thus, inter-piconet traffic scheduling also raises issues of intra-piconet traffic scheduling.

Since datacom traffic with a certain level of burstiness is assumed to be used for ACL traffic, the scheduler should allow for a dynamic bandwidth allocation among the users. At the same time, the use of a single transceiver unit forces a rather strict timing of the master and slave entities in nodes belonging to different piconets. These need to become active at the same time to utilize the given time window in their common piconet efficiently.

Thus, it can be seen that the simultaneous presence of two units in the same piconet need to be coordinated. The scheduling of traffic between piconets is henceforth referred to as inter-piconet scheduling. In addition to the inter-piconet scheduling, the traffic within each piconet needs also to be controlled in order to give an efficient, but fair, distribution of the bandwidth available inside the piconet. The latter scheduler, referred to as intra-piconet scheduling, should take the inter-piconet scheduling into consideration to avoid polling nodes that are not present in the current piconet. If, however, there are only two nodes in the piconet the intra-piconet scheduling is simplified.

In one aspect, the invention described herein focuses on an inter-piconet scheduling algorithm. However, the following section introduces an overall scheduling model, denoted scatternet scheduler, describing the interaction between an inter-piconet scheduler and an intra-piconet scheduler. Performed correctly, the interworking between the two schedulers enhances performance of the scatternet. Moreover, the model organizes the scheduling mechanism to help distinguish between the two levels of scheduling.

Architecture of Scatternet Scheduler

Figure 4:
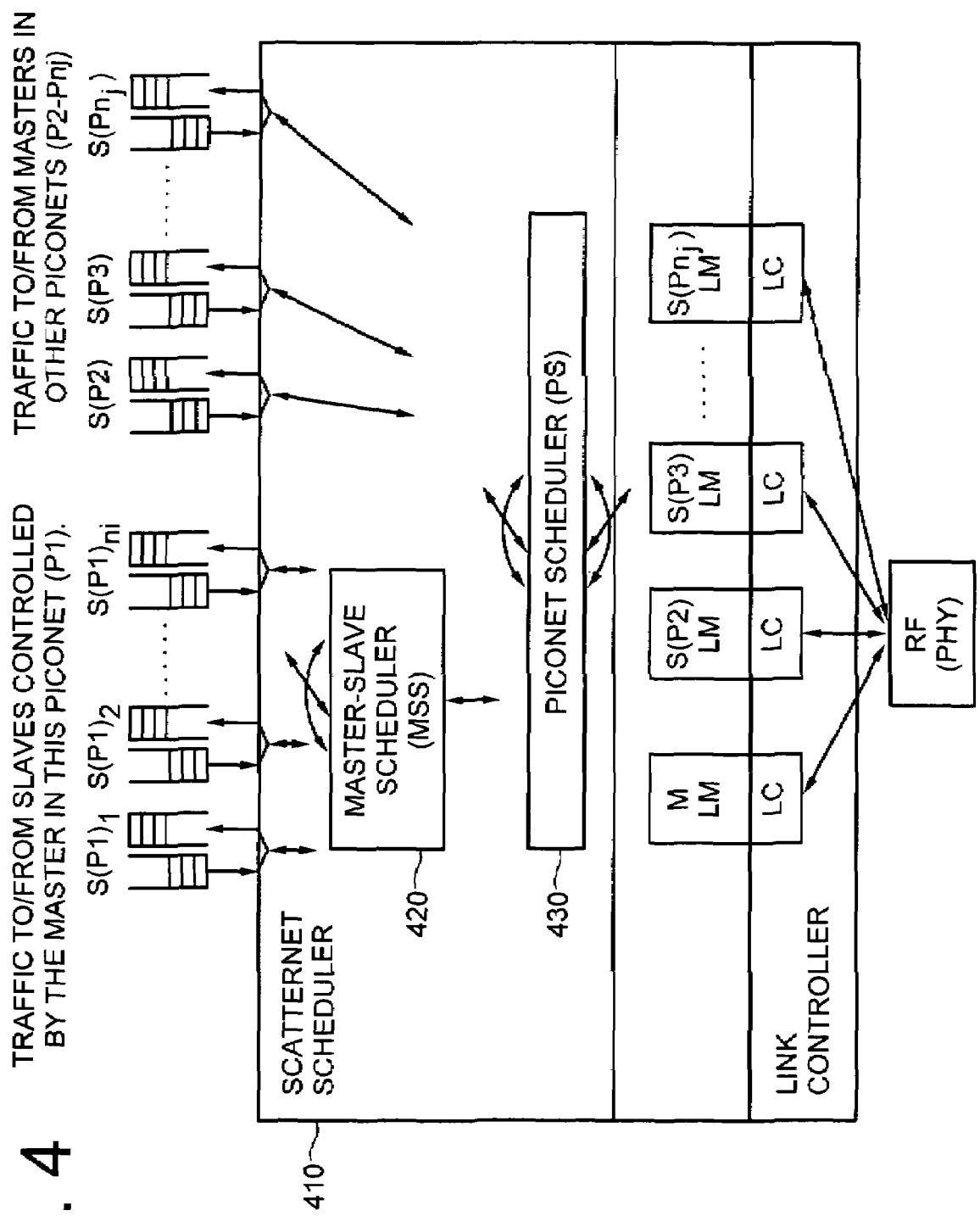
FIG. 4 is a schematic depiction of a scatternet scheduler in accordance with aspects of the present invention.

FIG. 4 is a schematic depiction of a scatternet scheduler 410 in accordance with aspects of the present invention. Scatternet scheduler 410 may be implemented in suitable digital logic circuits in a Bluetooth node. Scatternet scheduler 410 includes two components: a master-slave scheduler 420, which is actived only in master nodes, and a piconet scheduler 430, which is actived in both master nodes and slave nodes. The block diagram in FIG. 4 provides an overview of a scatternet scheduler 410 for a Bluetooth node that acts as the master node in one piconet, referred to as P1, and a slave node in adjacent piconets P2–Pn$_j$. Master-slave scheduler 420 is responsible for scheduling the downlink slaves (S$_1$ . . . S$_{ni}$) in P1 during time periods when the Bluetooth node acts as a master in piconet P1. Stated otherwise, the master-slave scheduler 420 is reponsible for intra-piconet scheduling. Piconet Scheduler 430 is responsible for determining the time periods during which the Bluetooth node is active as a master in Piconet P1 and when the Bluetooth node is active as a slave in one or more of piconets P2–Pn$_j$. Stated otherwise, piconet scheduler 430 is responsible for intra-piconet scheduling.

In an exemplary embodiment, piconet scheduler works on absolute timing, i.e., by identifying what time slot to invoke a certain slave or master, determining for how much time (or how many time slots or frames) the respective slave or master will have access to the radio interface, and scheduling the next interval during which they will become active. During the time period between active periods, the master-slave pair may put themselves in a power save mode, e.g., HOLD or SNIFF. By contrast, the master-slave scheduler works on a relative timer according to a suitable intra-piconet scheduling algorithm.

In an exemplary embodiment, a network node that desires to perform inter-piconet communication issues requested transmission rate and delay (QoS) parameters to the scatternet scheduler, which adapts the requirements further for the master-slave scheduler and the piconet scheduler.

Figure 5:
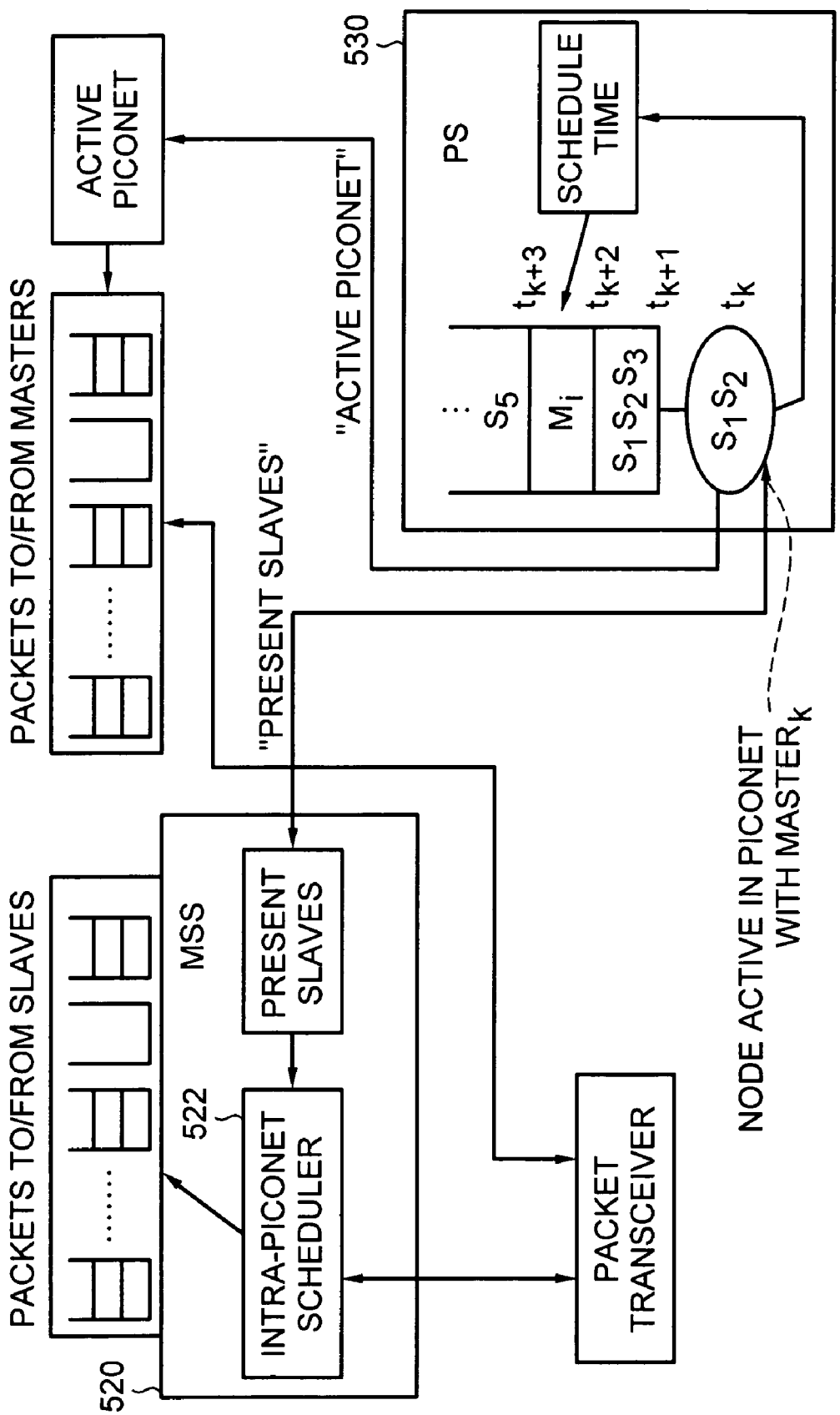
FIG. 5 is a schematic depiction, in greater detail, of a scatternet scheduler in accordance with the present invention.

FIG. 5 is a schematic depiction, in greater detail, of a scatternet scheduler 510 in accordance with the present invention. In the master-slave scheduler 520, slave nodes that are members in the piconet in which the node housing the scatternet scheduler 520 is master are scheduled using an intra-piconet scheduler 522 that implements a suitable scheduling algorithm (e.g. the B-FEP algorithm). Slaves that are pointed out by the piconet scheduler (PS) 530 are indicated to the master-slave scheduler, e.g. put into a list of active slaves that are eligible for polling by the master. The piconet scheduler 530 controls the timing during which a node is assigned to one of a plurality of respective piconets.

Figure 6A:
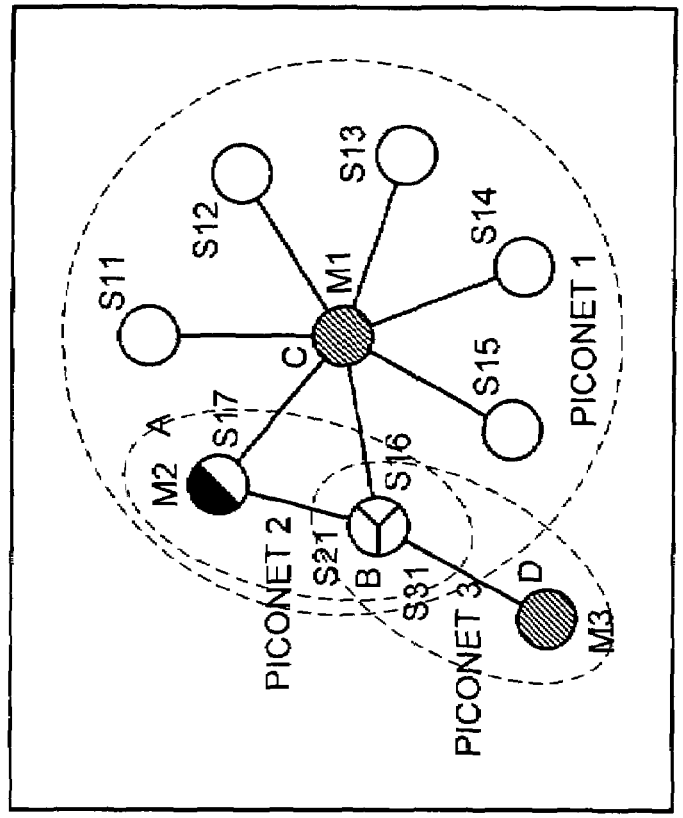
FIGS. 6a and 6b are schematic depictions of scatternets in accordance with aspects of the invention.
Figure 6B:
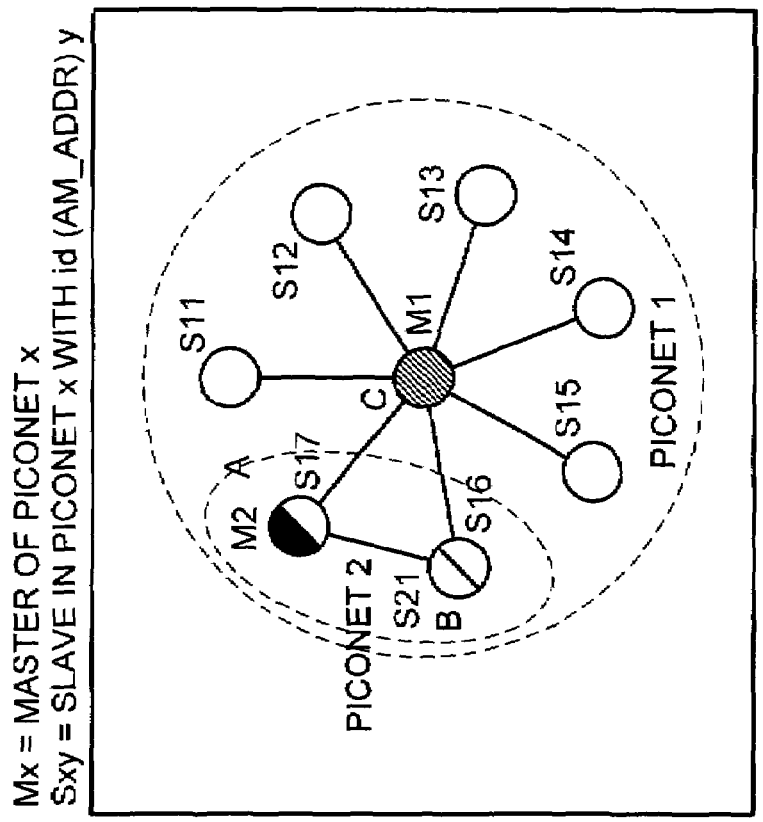

The scheduling algorithm implemented on the intra-piconet scheduler 522 on the master slave scheduler 520 uses the input from the piconet scheduler to decide what slaves are currently present in the master's piconet, denoted P1 in FIG. 6a and FIG. 6b. The slaves scheduled as present in P1 may still be inactive in terms of data transfer, however, and therefore defined as inactive by the intra piconet scheduling algorithm. Note that the piconet scheduler may schedule several slaves as being present, overlapping in time, since they belong to the same piconet.

The piconet scheduler 530 may be depicted as a list or array consisting of points in time when a slave or the master entity in a node shall become active and the issue is to co-ordinate the starting point and duration with the other peer slave or master entity. Because different piconet may have different slot timing, a switch between two piconets typically consumes at least one slot before any traffic may be sent. Therefore, selecting active intervals that are too short will result in excessive overhead. By contrast, selecting active intervals that are too long may induce excessively long packet delays.

In an ad-hoc network environment, there is no central control enforced between piconets. Thus, one approach to inter-piconet scheduling is based on a dual match between idle time intervals (t$_i$) and active (t$_a$) time intervals between a master and its slave. Note that an idle interval is only idle for the a particular master-slave pair and may be used (by both nodes) for communication within other piconets.

When either a slave or a master is no longer active in a piconet it may enter a power save mode to let the master, or slave(s), of the same piconet know that the node cannot be contacted. Either the SNIFF mode or the HOLD mode may be used in this respect. The SNIFF mode lets a slave listen to the master with a specified period T$_{sniff}$ and duration N$_{sniffattempt}$, which both are parameters negotiated with LMP (Link Management Protocol) messages. During HOLD mode no ACL traffic is sent from master to slave during a negotiated time period, T$_{hold}$, which also is negotiated with LMP messages.

A node that sets up SNIFF mode intervals in two piconets will have the same periodic activity pattern until new SNIFF intervals are negotiated. By contrast, if HOLD mode is used a new T$_{hold}$ must be defined at each end of a communication window in a piconet. Thus, if the piconet structure and/or traffic pattern do not change frequently, the SNIFF mode is a good alternative, while the HOLD mode may work better in more dynamic network.

Henceforth, the SNIFF mode is used as an example to define the joint time between master and slave pairs in different piconets.

Representative Scatternet Architecture and Information Architecture

To illustrate the description of a piconet scheduler, a representative scatternet is used as an example throughout this document. A scatternet depicted in FIG. 6a is a two-piconet scatternet, which is expanded into a three piconet scatternet depicted in FIG. 6b. This description is focused on the slave node taking part in all three piconets (containing slave entities, S16, S21, and S31) and the adjacent master (M1) and master/slave (M2/S17) nodes.

Referring to FIG. 6a, piconet 1 includes master M1 (identified as node C) and seven slaves identified as S1–S7. Additionally, two nodes of piconet 1 have created a separate piconet (piconet 2) to send data directly between the nodes without passing the master M1. Piconet 2 comprises a master node M2 (identified as node A) and a single slave node S21 (identified as node B). The continuation of the example to add a third piconet, as represented in Feb. 6b, is presented after a description of functions and mechanisms to add a piconet.

Figure 7:
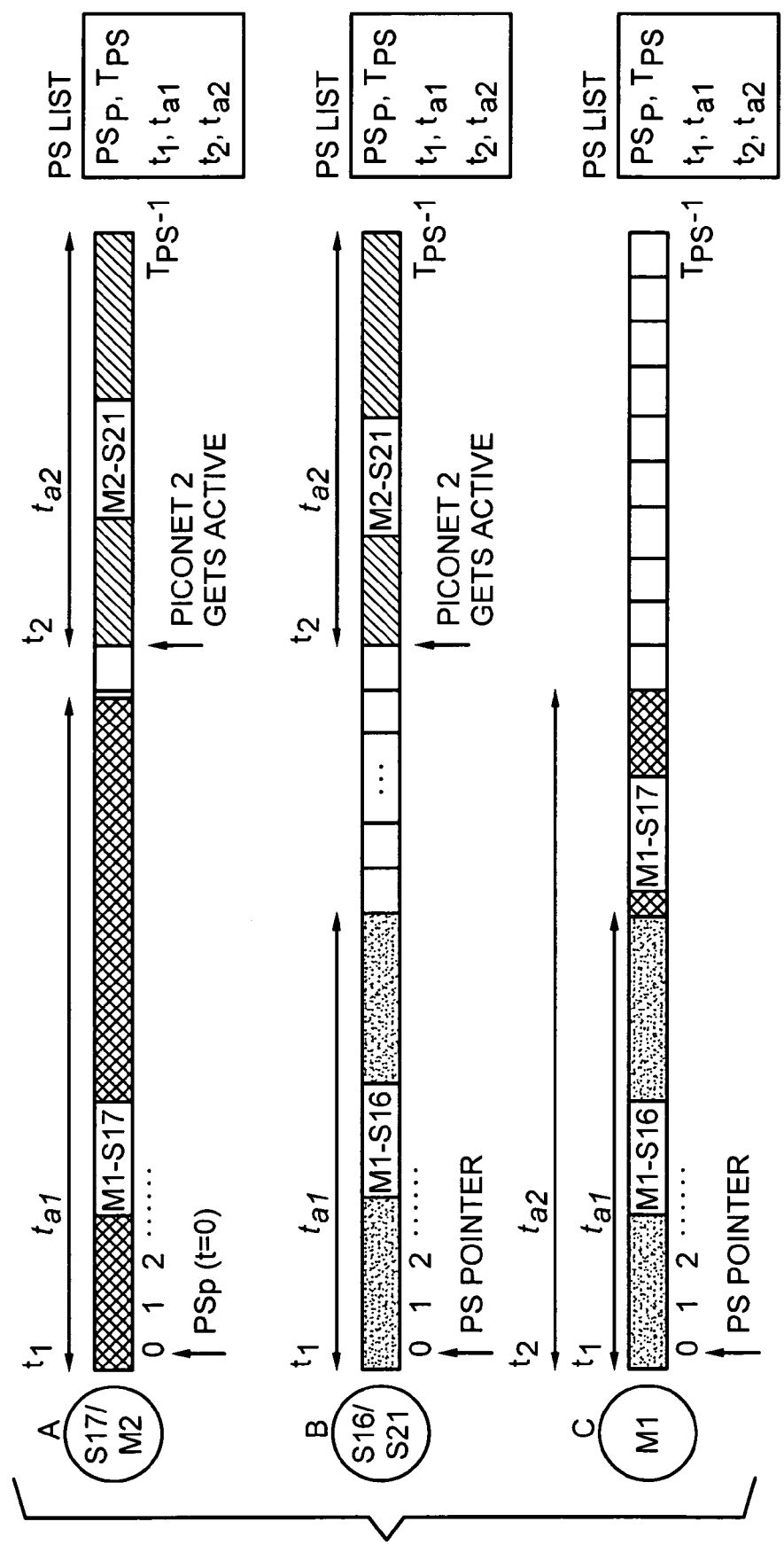
FIG. 7 is a depiction of piconet scheduler lists at various network nodes in a two piconet scatternet in accordance with the present invention.

FIG. 7 presents representations of the piconet scheduler list in the piconet scheduler of the three network nodes A, B, and C depicted both as data in a piconet scheduler list register and as sequences of frames representing the piconet scheduler lists. Note that the slots/frames of piconet 1 and piconet 2 need not be synchronized, but this is not illustrated in detail in the frame sequences. Instead one frame is used as guard frame when a node switches between piconets.

The length of the piconet scheduler list (counted in frames) depends on the time period defined for the SNIFF mode. The list can be seen as a cyclic register counted modulo $T_{ps}$, which corresponds to the period of the longest active SNIFF mode in a node. This period of frames a may be denoted a piconet scheduler frame, which includes a plurality of Bluetooth frames. Shorter periods may also be used provided $T_{PS}$ is a multiple of the shorter periods. Moreover, because piconets are asynchronous (i.e., the timing of connected piconets need not be synchronized) their clock frequencies may differ, resulting in a sliding offset between the slots/frames in the piconet. This means that SNIFF updates may be requred to adjust for the alignment between slots as active windows may "slide" and overlap. However, such updates are expected to be rather infrequent compared to updates caused by traffic dynamics. Note that a master node (e.g., node C in FIG. 6a) may schedule several overlapping slaves simultaneously. In the example, this is the only way node C can communicate with nodes A and B since they otherwise are both in piconet 2. In addition, all nodes that are in more than one piconet must also schedule time for overhead procedures such as INQUIRY/INQUIRY SCAN and PAGE/PAGE SCAN procedures in case they are defined as discoverable and connectable nodes. The particular time periods during which these procedures are scheduled is not critical to the present invetion, and accordingly is not described explicitly herein, but could be done, for instance, between two SNIFF intervals.

Referring to FIG. 6b, assume that the next step in the scatternet example is to add node D into the scatternet by forming a new piconet (piconet 3). Node D may connect to node B according to conventional Bluetooth connection procedures or according to the procedures described in one or more of the co-pending and commonly assigned U.S. patent applications incorporated by reference above.

A number of alternatives to include the new piconet in the piconet scheduler now arise:

Try to find a sufficiently large window of free time in node B that is not used to communicate with nodes A or C. If a sufficiently large time window is available, then node B can be scheduled to piconet 3 during this free time period and the piconet schedule lists do not need to be updated (e.g., by updating the existing SNIFF parameters)

By contrast, if node B's piconet scheduler list does not have a sufficiently large time window available to accommodate establishing a piconet between node B and node D, then either the $T_{PS}$ is increased for both A and C or the current time windows ($N_{sniffattempt}$) is decreased to make room for the new piconet in B.

Note that other events that cause the need to find free room in a piconet scheduler frame may also occur if an existing master-slave pair requires an increased time window at the same location in the piconet scheduler frame.

a master-slave pair requires changed location of their time window in time. However, then the capacity should be available but may not be allowed to move in time (i.e. the active window location in the piconet scheduler frame).

Other reasons to invoke a piconet scheduler change procedure may be due to a node (master or slave role) detaches from the master-slave pair and releases capacity, and/or a master-slave pair requires a new $T_{PS}$ period. This may trigger a full update of the entire piconet scheduler frame and potentially other master-slave pairs having one of the nodes as a shared node.

An autonomous adaptive allocation process decides to change the piconet scheduler frame structure of one or more allocations. This could be the result of procedures that detect under-utilized piconet scheduler frame windows.

Piconet Scheduler List Exchange

The process of finding an appropriate window for the new piconet involves an information exchange procedure, which information may be transmitted between Bluetooth units in an new type of LMP message or in modified versions of existing LMP messages. The information exchange may also take place using a dedicated protocol, other than LMP, which may run as a separate application using regular data packets. In general, piconet scheduler lists should be exchanged when a piconet scheduler frame needs to be changed in a node, for example due to adding or detaching node(s), changing bandwidth requirements (larger/smaller active window), or adjusting slot alignment (e.g., as discussed above).

In exemplary embodiments of the invention, piconet scheduler lists are exchanged between respective master and slave node pairs to be used as a basis for decision when a new piconet scheduler list is created. The information in the piconet scheduler list may be encoded as starting points and duration of scheduled slaves and master or possibly also as a binary array representation of a piconet scheduler frame. The latter can denote occupied and free frames in the current piconet scheduler frame for a node. One of ordinary skill in the art will appreciate other methods of exchanging piconet scheduler list data. For example, the piconet scheduler list data could be divided into smaller pieces that are sent in several packets and the receiver may assemble the information itself. Alternatively, the information could be exchanged by an application that runs in the background of the processor so that information may be exchanged constantly, periodically, or whenever capacity is available.

As a general rule, the master unit (e.g., the unit that acts as a master in a master-slave pair) in any pair of nodes makes the decision on a new piconet scheduler list of a slave. However, changes may be requested by a slave unit.

Figure 8A:
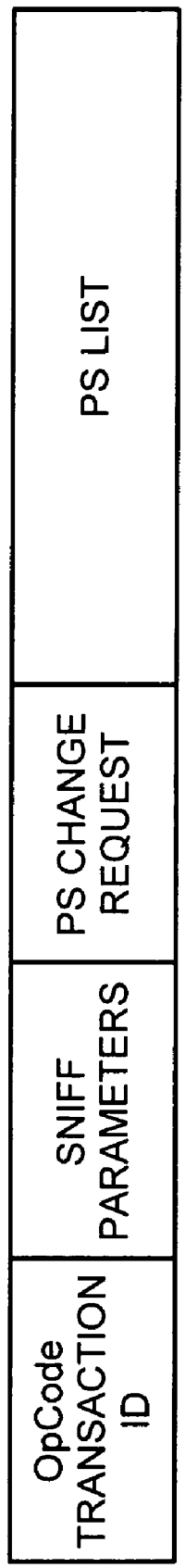
FIG. 8a is a schematic depiction of a modified SNIFF Request LMP packet in accordance with aspects of the present invention.
Figure 8B:
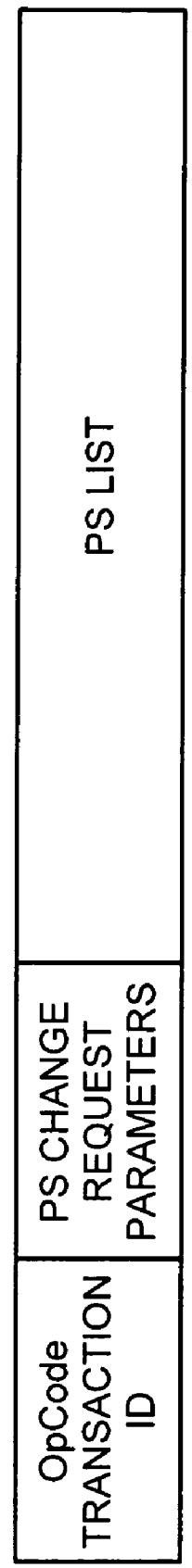
FIG. 8b is a schematic depiction of a piconet scheduler change request packet in accordance with aspects of the present invention.

If a slave node wants to initiate a change of its piconet scheduler frame it sends its piconet scheduler list, together with the desired change, to its master node either in a piconet scheduler change request LMP message or in a modified SNIFF request LMP message. The latter contains the same information as the original SNIFF message and also carries a representation of the piconet scheduler list in the last 7 currently unused bytes. In FIG. 8, the formats for the two alternatives are depicted. If the master accepts the change requested by the slave node, the master returns a piconet scheduler change accept LMP with the new piconet scheduler list, or a modified SNIFF accept LMP message. Otherwise, the master may return a piconet scheduler change request LMP with an alternative piconet scheduler list, or a piconet scheduler non-accept LMP message. The returned information could also contain information regarding the available capacity to facilitate the slave to make a better choice in a subsequent piconet scheduler change request. If necessary, a slave and master may execute several iterations of messages to negotiate mutually acceptable changes to the piconet scheduler list.

If a master unit wants to change its Piconet scheduler-frame, it issues the desired change request in a piconet scheduler change request LMP message, or in a modified SNIFF message, to the slave. If the slave accepts the change it replies with an piconet scheduler accept LMP message, which may also include capacity information to facilitate the master to make a better choice in a subsequent piconet scheduler change request. Otherwise it sends its piconet scheduler list to the master in a piconet scheduler change request message for the master to reply to, or it sends a piconet scheduler non-accept LMP message.

If piconet scheduler change LMP messages are used to exchange piconet scheduler lists, and result in an accept, they should be followed by a forced SNIFF set-up (SNIFF LMP) from the initiator based on the agreed piconet scheduler list, as illustrated in FIG. 9. By contrast, if modified SNIFF LMP messages are used to exchange piconet scheduler lists, the SNIFF mode parameters are set up directly if an agreement on piconet scheduler lists is reached, as illustrated in FIG. 10.

To provide time to perform piconet scheduler list matching, etc., the piconet scheduler change request may be sent early in a piconet scheduler frame window, and the response may be sent in the end of the same window. Given that the distance is n slots, n can be in the range of 1, 3, 5, . . . , $t_{\alpha i}$ where $t_{\alpha i}$ is the length of the piconet scheduler frame window for piconet i.

Suitable rules for accepting or denying a piconet scheduler frame change are discussed below.

Piconet Scheduler Frame Allocation Algorithms

As illustrated above, changing the piconet scheduler frames in two nodes involves a negotiation procedure between the two involved nodes of a link. The effort, or computation complexity, involved in changing a piconet scheduler frame varies as a function of the number piconets to which a network node is already allocated. As a general rule; a piconet scheduler frame change is controlled by the master in the piconet, but a slave with stringent piconet scheduler frame requirements may deny a piconet scheduler frame change from its master.

In brief, each network node includes a memory that stores a number of network parameters. The piconet scheduler frame request messages also include a number of parameters relevant to the desired QoS for the requested link. When a network node receives a piconet scheduler frame request message, a processor associate with the node applies a set of logic rules to the parameters to make a determination about the characteristics of a new piconet scheduler list, if it is necessary to create one.

Piconet Scheduler Change Request Parameters

A request for changing the piconet scheduler frame for piconet i in a node that is present in several piconets comprises a number of parameters piconet scheduler frame period, $T_{PSi}$ active window size, $t_{\alpha i}$ starting point, $d_i$ (number of frames counted from "now")

objective rate, $r_{oi}$ (allocated frames/piconet scheduler Frame Period, i.e. $t_{\alpha i}/T_{PSi}$)

priority class, $pc_i$

One or more of these parameters may be left open if no requirement is defined when the request is issued. However, an objective rate should usually be defined (e.g., even by default if both $T_{PSi}$ and $t_{\alpha i}$ are left open), but may be overruled if they are defined. The objective rate parameter does not need to define an actual data transfer rate in packets; it may define a window that provides a desired share of the total capacity of the air interface, assuming the node is alone with the master in the scheduled piconet. An absolute required rate could also be considered, but would require the request to be directly considered by the intra-piconet scheduler (MSS).

The priority class parameter is used to give priorities between the allocated piconets in a node. An incoming request with a higher priority may override an active time window for a piconet with a lower priority. The request may also be considered by the intra-piconet scheduler to give an assured bandwidth share of the piconet. The priority class parameter may also be used to allow nodes with tight timing requirements and/or nodes that are members of many piconets to get preference on their existing or required active window allocations in a piconet scheduler frame.

One of the priority levels should be a "best effort" level where the objective rate may be set to the maximum potential nominal rate (equal to 1) which should be interpreted as the node should be given the fair share of the capacity within the same (best effort) class. In that case the node accepts any setting of the piconet scheduler Frame Period, $T_{PSi}$, thus the traffic is not delay sensitive. Moreover, the starting point is then generally of minor concern.

A higher priority class may require a specific combination of the $T_{PSi}$ and $t_{\alpha i}$ parameters, where the starting point parameter, $d_i$, also may be significant.

It will be appreciated that the system may contain one or more priority classes.

Local Node Parameters

The following parameters should be locally stored in a node to be able to perform the piconet scheduler Change Request procedures:

$C_{sys}$, Capacity reserved for system procedures as for instance INQUIRY and PAGE. This capacity may not be shared by any user traffic unless circuit switched traffic is scheduled in any of the active piconets of a node.

$C_{av1}$, The capacity available in the priority classes below and including the priority class of the issued Piconet scheduler change request.

$C_{av2}$, The capacity available in the priority classes below the priority class of the issued Piconet scheduler change request. Already allocated capacity from the requesting node is however excluded from the $C_{av2}$.

$C_{FS}$, The fair share capacity of a piconet in a node for traffic in a priority class of best effort type.

$n_{Lpci}$, The number of allocations in the node that are below the $C_{FS}$ in priority class $pc_i$, i.e. limited flows.

$n_{pci}$, The total number of allocations in the node of priority class $pc_i$.

$\rho_i(k)$, Load level of the active window for piconet i in Piconet schedulerframe number k, i.e. the momentary utilization of the Allocated frames in one active window for piconet i.

$t_{usedi}(k)$, The number of frames in the active window of piconet i that carry user data in Piconet schedulerframe number k.

In addition to theses parameters, the Piconet scheduler change Request parameters and the Piconet scheduler list itself must also be stored in the node to be updated and prepared for any upcoming Piconet scheduler change Request message.

Piconet Scheduler Change Request Procedures

In an exemplary embodiment, the following steps are processed by a node that gets a request for piconet scheduler change including the piconet scheduler list from the requesting node. The request could be issued in either a piconet scheduler Change Request LMP message or in a modified SNIFF Request LMP message:

1) A node that receives a request for a Piconet scheduler change from piconet i, within priority class $pc_i$, first checks the available capacity for that priority class. Capacity already allocated by lower priority classes is also considered as eligible for allocation by this request. The total available (normalized) capacity for a piconet (master-slave pair) j with priority class $pc_j$, including capacity already allocated within its own priority class, $C_{av1}$, may be calculated as follows:

$$C_{av1} = 1 - C_{sys} - \sum_{i \in (pc_i > pc_j)} r_{oi},$$

where $C_{sys}$ is capacity reserved for system traffic (INQUIRY/PAGE procedures) and the sum denotes capacity allocated for higher priority traffic.

If no capacity is considered available, e.g. the issued objective rate $r_{oj} > C_{av1}$, a non-accept message is sent back to the request initiator at this stage and the Piconet scheduler change request procedure is aborted here. The non-accept message may contain the information, say the $C_{av1}$ parameter, to allow the initiator to issue a new request with a better chance of getting accepted.

Exception for abortion at this stage is for instance that the priority class is of type best effort, implying that the requested capacity is subject for reduction by the receiving node. Then step 4 may be entered at this stage.

2) If there is capacity available enough, a further refinement is made to determine how the change should be accommodated. Let $C_{av2}$ be the capacity available for priority classes below $p_{ci}$, i.e.

$$C_{av2} = C_{av1} - \sum_{i \in (pc_i > pc_j, i \neq j)} r_{oi}$$

where the sum denotes the allocated capacities for the same priority class as the one requested, but with the exclusion of any capacity already allocated by the requesting master slave pair. The latter applies if the change request is a change of an existing allocation by a master-slave pair.

If no capacity is considered available, taken from unused or lower priority classes, based on e.g. the issued objective rate $R_{oj} > C_{av2}$, step number 4 is entered at this stage, otherwise step 3 is entered.

3) At this stage there is sufficient capacity to accommodate the request either by allocating unused or by allocating lower priority allocated capacity.

If the request only states the objective rate, a response is given back with the requested allocation assigned to a new piconet scheduler list on a best fit basis. The latter may involve a procedure that tries to pack the piconet scheduler frame as tight as possible to avoid fragmentation of the piconet scheduler frame.

If the request from piconet j requires specific values for the $T_{PSj}$ and $t_{\alpha j}$ parameters and these values are not in conflict with the existing $T_{PS}$ value, then the request is accepted by sending the new, updated piconet scheduler list back to the initiator.

If the request from piconet j requires specific values for the $T_{PSj}$ and $t_{\alpha j}$ parameters for the request from piconet j and they are in conflict with the existing $T_{PS}$ value, then the request should be accepted if there is no higher priority class present among the allocated piconets and rearrangements of the piconet scheduler frame within the same class is accepted, or there is no higher priority class present among the allocated piconets and piconet j is the only piconet present within its own priority class.

One example of a conflict here is the case when the requested $T_{PSj}$ value is not a multiple of the existing $T_{PS}$ period. This would result in consecutive piconet scheduler frames that are not identical, which could cause the windows to "slide" into each other.

If the request is accepted, then a response is sent back with the requested allocation assigned to a new piconet scheduler list on a best fit basis, or else step 4) is entered. The former may involve a procedure that tries to pack the piconet scheduler frame as tight as possible to avoid fragmentation of the piconet scheduler frame. An exemplary method for packing the piconet scheduler frame is discussed below. If a rearrangement of the piconet scheduler frame is necessary, a sequence of piconet scheduler change procedures with other piconets may be triggered at this node.

4) This step is entered if capacity within the requested priority class must be shared to accommodate the requested capacity.

If the requested priority class does not allow any sharing, then a non-accept message is sent back to the request initiator and the piconet scheduler change request procedure may be aborted here. The non-accept message may contain information (e.g., the $C_{av2}$ and/or $C_{av1}$ parameter(s)) to allow the initiator to issue a new request with a better chance of getting accepted.

If sharing is allowed, e.g. the priority class is of type best effort, then the fair share allocation for the request is calculated according to the rule for sharing is adopted for the system.

An example of a fair share allocation rule for the fair allocation in piconet j, $C_{FSj}$, is given below:

$$C_{FSj} = \min\left(\frac{C_{av1} - C_{Lpcj}}{n_{pcj} - n_{Lpcj}}, r_{oj}\right)$$

where $n_{pcj}$, $C_{Lpcj}$ and $n_{Lpcj}$ are parameters denoting the total number allocations including the new request, the aggregated limited capacity, and the number of limited flows respectively, all within the priority class $pc_j$. A "limited flow" is an allocation, $C_{FSi}$ say, that conforms with the rule $$C_{FSi} > \frac{C_{avl}}{n_{pcj}},$$

i.e. the allocation would not use its full fair share with the new allocation. Limited flows could be the result of flows passing a bottleneck node in a multi-hop network in which the fair share is less than the one offered in this node, or an application that is limiting the flow. The "min" operation in the $C_{FSj}$ calculation assure that only the requested objective rate is allocated, thus the allocated flow from piconet j may become limited from start.

Once the fair share allocation is determined, the new piconet scheduler list with the new allocation is sent back to the initiator. In addition this process will trigger piconet scheduler change procedures of existing allocations affected of the new allocation, i.e. nodes that have allocations $$allocations > \frac{C_{avj}}{n_{pcj}}.$$

Once steps 1 through 4 are gone trough the outcome should have been either an accept or a non-accept. In case the piconet scheduler change messages are used, a forced SNIFF allocation is issued if the piconet scheduler change was accepted.

When a new piconet scheduler List is created it may take some time for the node to start using it since it still is committed to an ongoing piconet scheduler frame that may be affected of the new piconet scheduler frame. Therefore, the node should store the new piconet scheduler frame and continue with the old piconet scheduler list until all affected nodes has updated their piconet scheduler list to be in accordance (match) with the new piconet scheduler list. The $d_i$ and/or the $d_j$ parameter may be used to denote when an active window in a new piconet scheduler list can be used for the first time.

Piconet Scheduler List Matching Algorithm

During the piconet scheduler request procedure, a matching attempt is made between the piconet scheduler list from the requesting node and the piconet scheduler list residing in the receiving node. If possible, the piconet scheduler change request parameters should be fit into any positions available during corresponding time slots in both piconet scheduler lists. This avoids updates of other concurrent piconets in both of the involved nodes (the master-slave pair).

By way of example, assume a node S (sender) sends a piconet scheduler change request message to a node R (receiver). The request contains data representative of S's piconet scheduler list, $PS_S$. Node R must then determine whether there is a mutually acceptable block of capacity allocable to a communication session between node S and node R. In an exemplary embodiment, node R makes this determination by attempting to find a sufficiently large block of available capacity in corresponding time slots in $PS_S$ and $PS_R$.

Node R may make this determination by performing the following steps, preferably only when the piconet scheduler change request procedures described above conclude that there is sufficient capacity to accommodate the request. It should be noted that this procedure may result end in a non-accepted Piconet scheduler change request.

1) A processor operatively associated with the piconet scheduler creates two binary arrays representative of the piconet scheduler lists $PS_S$ and $PS_R$, denoted $PS_{BS}$ and $PS_{BR}$ respectively. The binary arrays represent the piconet scheduler frames of the two nodes S and R, and each position corresponds to a frame in the piconet scheduler frame. Consequently, the length of a binary array corresponds to the duration of the node's piconet scheduler frame (e.g., $T_{PS}$). The content of a position binary array representing piconet scheduler list may be set to a binary "1" if it is part of an active window and to a binary "0" if the time slot it represents is free to be allocated to the request. If the piconet scheduler change request represents a change of an already allocated window, the window already present should be excluded from the $PS_s$ and a request for an entire new window should be issued.

It will be appreciated that the piconet scheduler list transmitted in the piconet scheduler change request message may be in the form of a binary array that represents the piconet scheduler list, which would render the step of creating this array unnecessary. The particular form in which the piconet scheduler list is represented in the piconet scheduler change request message is a function of engineering and network economics, and is not critical to the present invention.

2) The processor performs a bit-wise "AND" operation on the binary arrays that represent the piconet scheduler list. The bitwise "AND" operation results in a third binary array (e.g., $PS_{B1}=PS_{BS}$ AND $PS_{BR}$) that contains binary "1"s in the locations in which node S and R have binary "1"s, e.g., those locations that represent free capacity.

3) The free locations in $PS_{B1}$ may be compared to the piconet scheduler change Request parameters issued by node S. Depending on how the strict the request was regarding position and objective rate, the issued active window is matched against the free locations. If no requirements on the location in the Piconet scheduler frame is issued it is only the size of continuously free frames that is matched. A best fit should be made which means that the smallest free window that satisfy the issued objective rate should be used.

4) If no satisfactory location can be found, a piconet scheduler change non-accept message is prepared.

5) If a location could be found, then the new active window is included into the piconet scheduler lists of nodes S and R in the format used by the nodes.

If the location of the active window is of concern it may be checked against available frames in $PS_{BR}$ already in step 2 before $PS_{B1}$ is created.

It will be appreciated that performing a bit-wise binary "AND" operation on the arrays representing the piconet scheduler lists is only one exemplary method of determining whether there is a mutually acceptable capacity block allocable to the request. By way of example, unallocated (e.g., "free") blocks could be represented by binary "0"s and a bitwise binary "NOR" operation could be conducted on the arrays. Other suitable digital logic techniques are within the skill of one of ordinary skill in the art.

Adaptive Piconet Scheduler Allocation Algorithm

For some priority classes, typically the best effort priority class, a node may run an adaptive allocation algorithm in the background to change the piconet scheduler frame content when nodes are not using its full window or when more capacity should be given to a piconet in a node. In essence the idea is to keep a record of the utilization, $\rho_i(k)$, of each active window at time k in a piconet scheduler frame. The utilization may be calculated according to $$\rho_i(k) = (1 - \alpha)\rho_i(k - 1) + \alpha \frac{t_{usedi}(k)}{t_{ai}}$$

which gives an exponential averaging of the utilization ($\alpha$ is a filter coefficient to be set in the interval (0,1)). The variable $t_{usedi}(k)$ is a count of the number of frames that were used for carrying traffic in piconet i in piconet scheduler frame number k. This counting is made continuously in the node for each piconet and without distinguishing between uplink and downlink packets.

A piconet scheduler change request may be invoked when the difference $$r_{di} = \rho_i(k) - r_{oi}$$

exceeds a predefined interval $[r_{di\_low}, r_{di\_high}]$ which may be based on a percentage value of the objective rate so as to form a generic tolerance for the objective rate in the adaptive allocation context. If a new piconet scheduler change request is decided upon, a new objective rate is defined based on the utilization level and issued in the piconet scheduler change request procedure.

Adding Additional Piconets to the Scatternet

Referring again to FIG. 6(b), the next step in the scatternet example is to add a third piconet, e.g., by connecting node D to node B.

Node D may be connecting using a priority class of a best effort type and, likewise, node B may be assumed to have allocated piconets only of type best effort. Further, Node D discovered node B through an INQUIRY procedure and is now making a PAGE to node B to set up a new piconet in which it wishes to be the master. During the connection establishment process node D may determine whether node B is member of another piconet by utilizing the information exchange described in one or more of the commonly assigned and co-pending U.S. patent applications incorporated by reference above. If node B is a member of another piconet, then node D issues a piconet scheduler change Request including a capacity parameter to be considered by node B.

Alternatively, node B may issue a piconet scheduler change Request to node D immediately after the connection is established to include node D in its piconet scheduler list. In the latter case node B may make an estimated request for the capacity between D and B since B is not the initiator of the connection.

Figure 11:
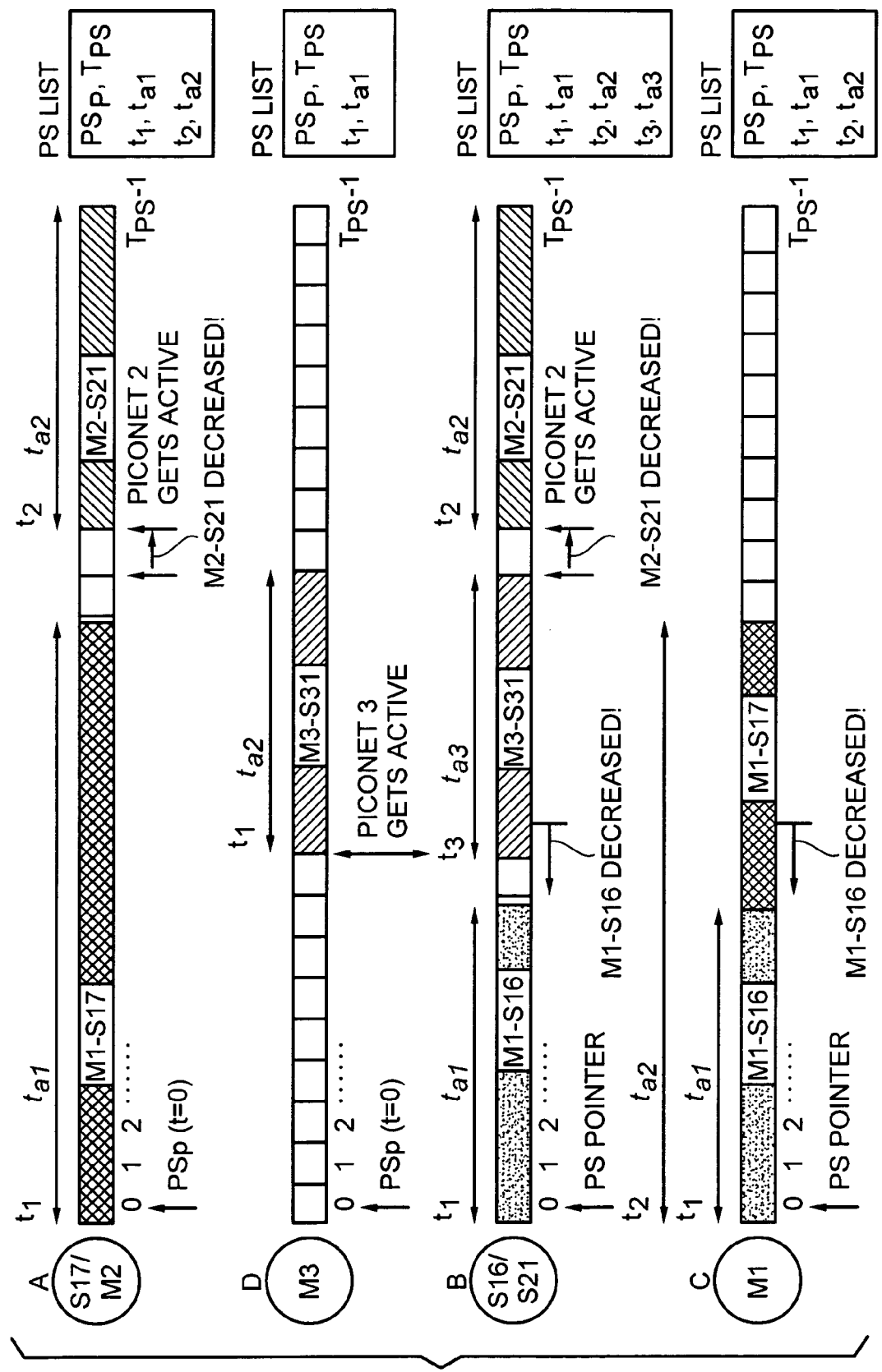
FIG. 11 is a schematic depiction of piconet scheduler lists at various network nodes in a three piconet scatternet in accordance with the present invention.

In FIG. 11 the new piconet scheduler frames for the involved nodes are depicted. In node B, the active windows with nodes A and C have been shrunk to fit in the active window with node D.

The change of the piconet scheduler lists in the other affected nodes (A and C) must be made by the piconet scheduler change procedures described in the previous subsections above. Typically it would in this case be initiated by node B since it agreed to the change of its piconet scheduler frame. Thus, the other piconet scheduler frames in nodes A and C must match this change.

In general, a change in one part of a scatternet may result in a sequence of piconet scheduler change procedures in several other affected nodes. It may also be the case that a piconet scheduler change, request must be repeated with the same node to reach a steady state of the piconet scheduler frames in that portion of the scatternet.

Use of the Hold Mode

The difference between the HOLD mode and SNIFF mode is that the former must be reallocated each time an active window expires. This means that for each active window a piconet scheduler change procedure must be performed between two node. The format of the piconet scheduler change Request message may be the same, but the requirement that the $T_{PSi}$ must be dividable to maintain a periodic piconet scheduler frame can be relaxed since the Piconet scheduler frame is renewed continuously.

However, there is still a use for a $T_{PS}$ parameter as a reference for the objective rate and also as a limit on the delay in the system. Without this limit the active windows may grow uncontrolled during high load conditions in a node.

SCO Channels

If any of the allocated piconets in a node uses SCO channels this limits the number of simultaneous piconets in a node to a maximum of only two. This since the maximum distance between two SCO frames is three frames. A switch between two piconets requires one frame, leaving only one frame left for communication in the two piconets involved. A scatternet case with SCO channels is preferably set up with SNIFF since HOLD must be allocated before each switch between piconets. The $T_{PS}$ parameter will in the SNIFF case be set to the SCO interval of three frames.

While the invention has been described in the context of a Bluetooth network and using Bluetooth terminology, it will be appreciated that the invention may be used in any cluster forming packet switched radio network where TDMA is used to divide the presence for a node in several simultaneous clusters. Moreover, a node in this system should typically only have one transceiver which must be tuned into one cluster at a time, i.e. it can receive and transmit in one cluster at a time only.

The packet format to exchange the piconet scheduler lists and change requests can be generic and the piconet scheduler frame structure may be used either periodically or be changed for each transmission.

Furthermore, the steps described to determine if a piconet scheduler change can be allowed or not in a node may be applied very generically to a system described above.

What is claimed is:

1. In an ad-hoc communication network in which terminals may belong to more than one piconet, a method of modifying the allocation of a terminal's capacity between two or more networks, comprising the steps of:
   receiving, in a first terminal communicating in a first ad-hoc network, a request from a second terminal to modify the first terminal's capacity allocation to communicate in a second ad-hoc network with at least the second terminal;
   determining whether the first terminal has sufficient available capacity to accommodate the request; and
   if the available capacity is sufficient, then comparing the capacity allocation of the first terminal to the capacity allocation of the second terminal to determine mutually acceptable capacity blocks allocable to satisfy the request.

2. A method according to claim 1, wherein:
   the request from the second terminal includes a parameter that represents the priority class of a desired capacity allocation; and the step of determining whether the first terminal has sufficient available capacity includes capacity allocated by the first terminal to priority classes equal to and lower than the priority class parameter in the request from the second terminal.

3. A method according to claim 1, wherein:
if the first terminal does not have sufficient capacity available, then the first terminal transmits to the second terminal a data messaging indicating rejecting the request.

4. A method according to claim 1, further comprising the step of:
modifying the first terminal's capacity allocation to accommodate the request from the second terminal.

5. A method according to claim 4, further comprising the step of:
transmitting a data message from the first terminal to the second terminal indicating that the request has been accommodated.

6. A method according to claim 5, further comprising the step of:
transmitting a data message from the first terminal to a third terminal, the data message including information representative of the first terminal's modified capacity allocation.

7. A method according to claim 1, further comprising:
receiving, in the first terminal, a request from at least one additional terminal to modify the first terminal's capacity allocation to communicate in at least one additional ad-hoc network;
determining whether the first terminal has sufficient available capacity to accommodate the request; and
if the available capacity is sufficient, then comparing the capacity allocation of the first terminal to the capacity allocation of the at least one additional terminal to determine mutually acceptable capacity blocks allocable to satisfy the request.

8. In an ad-hoc communication network in which terminals may belong to more than one piconet, a method of modifying the allocation of a terminal's capacity between two or more networks, comprising the steps of:
receiving, in a first terminal, a request from a second terminal to modify the first terminal's capacity allocation;
determining whether the first terminal has sufficient available capacity to accommodate the request; and
if the available capacity is sufficient, then comparing the capacity allocation of the first terminal to the capacity allocation of the second terminal to determine mutually acceptable capacity blocks allocable to satisfy the request,
wherein the step of comparing the capacity allocation of the first terminal to the capacity allocation of the second terminal to determine mutually acceptable capacity blocks allocable to satisfy the request comprises:
creating a first digital representation of the first terminal's capacity allocation in a first domain;
creating a second digital representation of the second terminal's capacity allocation in the first domain; and
comparing the first and second digital representations to determine mutually acceptable capacity blocks.

9. In an ad-hoc communication network comprising a plurality of Bluetooth units adapted to allocate capacity between at least two different piconets, a method of modifying a terminal's capacity allocation between a first piconet and a second piconet, comprising the steps of:
receiving, in a first terminal communicating in the first piconet, a request from a second terminal to modify the first terminal's capacity allocation to communicate in a second piconet with at least the second terminal, the request including a digital representation of the second terminal's capacity allocation;
determining whether the first terminal has sufficient available capacity to accommodate the request; and
if the first terminal's available capacity is sufficient, then comparing the capacity allocation of the first terminal to the capacity allocation of the second terminal to determine mutually acceptable capacity blocks allocable to satisfy the request.

10. A method according to claim 9, further comprising:
receiving, in the first terminal, a request from at least one additional terminal to modify the first terminal's capacity allocation to communicate in at least one additional piconet;
determining whether the first terminal has sufficient available capacity to accommodate the request; and
if the available capacity is sufficient, then comparing the capacity allocation of the first terminal to the capacity allocation of the at least one additional terminal to determine mutually acceptable capacity blocks allocable to satisfy the request.

11. A capacity allocation module for a first communication terminal, comprising
a communication module for communicating in a first ad-hoc network and for receiving a request from a second communication terminal to modify the first terminal's capacity allocation to communicate in a second ad-hoc network with at least the second terminal, the request including a digital representation of the second terminal's capacity allocation;
a memory module for storing a digital representation of the first terminal's capacity allocation; and
a processor module operative associated with the memory module for comparing the first terminal's capacity allocation with the second terminal's capacity allocation to determine mutually acceptable capacity blocks allocable to satisfy the request.

12. A capacity allocation module for a first communication terminal, comprising;
a communication module for receiving a request from a second communication terminal to modify the first terminal's capacity allocation, the request including a digital representation of the second terminal's capacity allocation;
a memory module for storing a digital representation of the first terminal's capacity allocation; and
a processor module operative associated with the memory module for comparing the first terminal's capacity allocation with the second terminal's capacity allocation to determine mutually acceptable capacity blocks allocable to satisfy the request,
wherein the digital representation of the first terminal's capacity allocation comprises a first array of binary digits, wherein each element of the array represents a time slot in the terminal's capacity allocation, and wherein a binary "1" represents a free time slot;
the digital representation of the second terminal's capacity allocation comprises a second array of binary digits, wherein each element of the array represents a time slot in the terminal's capacity allocation, and wherein a binary "1" represents a free time slot; and
wherein the processor performs a bit-wise binary AND function on the first array and second array to determine mutually acceptable capacity blocks.

* * * * *

UNITED STATES PATENT AND TRADEMARK OFFICE
CERTIFICATE OF CORRECTION

PATENT NO.          : 6,975,613 B1
APPLICATION NO. : 09/454758
DATED                   : December 13, 2005
INVENTOR(S)        : Per Johansson It is certified that error appears in the above-identified patent and that said Letters Patent is hereby corrected as shown below:

Claim 1, Col. 18, lines 63-67 should read

Change "request." to -- request, wherein the request from the second terminal includes a parameter that represents the priority class of a desired capacity allocation; and the step of determining whether the first terminal has sufficient available capacity includes capacity allocated by the first terminal to priority classes lower than the priority class parameter in the request from the second terminal. --

Claim 11, Col. 20, lines, 38-42 should read

Change "request." to -- request, wherein the communication module is also for receiving a request from at least one additional terminal to modify the first terminal's capacity allocation to communicate in at least one additional ad-hoc network, the request including a digital representation of the at least one additional terminal's capacity allocation. --

Signed and Sealed this

Nineteenth Day of December, 2006

JON W. DUDAS
*Director of the United States Patent and Trademark Office*